United States Patent
Sambandam

(10) Patent No.: US 7,464,185 B2
(45) Date of Patent: Dec. 9, 2008

(54) METHOD AND APPARATUS FOR TRANSFERING DATA FROM A SENDING SYSTEM TO A RECEIVING SYSTEM, AND PROGRAM STORAGE DEVICES

(75) Inventor: Suresh Sabapathy Sambandam, Chennai (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1353 days.

(21) Appl. No.: 10/135,961

(22) Filed: Apr. 30, 2002

(65) Prior Publication Data

US 2003/0204629 A1    Oct. 30, 2003

(51) Int. Cl.
*G06F 15/16* (2006.01)

(52) U.S. Cl. .................................... 709/247

(58) Field of Classification Search ................ 709/23, 709/217, 224, 228, 247, 202, 230; 707/101; 717/171

See application file for complete search history.

(56) References Cited

U.S. PATENT DOCUMENTS

| | | | | | |
|---|---|---|---|---|---|
| 4,876,541 | A | * | 10/1989 | Storer | 341/51 |
| 5,657,452 | A | * | 8/1997 | Kralowetz et al. | 709/227 |
| 5,768,525 | A | * | 6/1998 | Kralowetz et al. | 709/228 |
| 5,862,347 | A | * | 1/1999 | Suzuki et al. | 709/247 |
| 6,009,456 | A | * | 12/1999 | Frew et al. | 709/202 |
| 6,112,244 | A | * | 8/2000 | Moore et al. | 709/228 |
| 6,151,627 | A | * | 11/2000 | McBride et al. | 709/224 |
| 6,314,565 | B1 | * | 11/2001 | Kenner et al. | 717/171 |
| 6,339,756 | B1 | * | 1/2002 | Hinderks | 704/201 |
| 6,339,787 | B1 | * | 1/2002 | Yohe et al. | 709/217 |
| 6,385,656 | B1 | * | 5/2002 | Appelman | 709/247 |
| 6,434,168 | B1 | * | 8/2002 | Kari | 370/521 |
| 6,574,280 | B1 | * | 6/2003 | Liau et al. | 375/242 |
| 6,574,593 | B1 | * | 6/2003 | Gao et al. | 704/222 |
| 6,604,106 | B1 | * | 8/2003 | Bodin et al. | 707/101 |
| 6,624,761 | B2 | * | 9/2003 | Fallon | 341/51 |
| 6,839,413 | B1 | * | 1/2005 | Brock et al. | 379/93.08 |
| 6,842,768 | B1 | * | 1/2005 | Shaffer et al. | 709/203 |
| 6,873,877 | B1 | * | 3/2005 | Tobias et al. | 700/94 |
| 2001/0010040 | A1 | * | 7/2001 | Hinderks | 704/500 |
| 2003/0177172 | A1 | * | 9/2003 | Duursma et al. | 709/203 |
| 2003/0197794 | A1 | * | 10/2003 | Sakata | 348/222.1 |

* cited by examiner

*Primary Examiner*—Douglas B Blair

(57) ABSTRACT

A method of transferring data from a sending system to a receiving system in a network is disclosed. The sending system compresses the data according to a selected compression technique without regard to availability of a corresponding decompression technique at the receiving system. The sending system sends the compressed data and an identifier identifying the selected compression technique in a message to the receiving system. Upon reception of the message, the receiving system determines, using the identifier, if the corresponding decompression technique is available at the receiving system. If it is determined that the decompression technique is not available, the receiving system acquires automatically the decompression technique from outside of the receiving system. The receiving system decompresses the compressed data using either the locally available or the acquired decompression technique. The sending system and a receiving system that performs the above method is also disclosed.

10 Claims, 1 Drawing Sheet

METHOD AND APPARATUS FOR TRANSFERRING DATA FROM A SENDING SYSTEM TO A RECEIVING SYSTEM, AND PROGRAM STORAGE DEVICES

BACKGROUND

This invention relates to a method and an apparatus for transferring data from a sending system to a receiving system. More particularly, the data that is transferred is compressed using a compression/decompression technique selected by the sending system without the sending system knowing if the selected technique is supported by the receiving system.

To increase the bandwidth of a computer network having multiple nodes acting as sending and receiving systems, compressed data is typically exchanged between the systems. Typically it is the responsibility of a sending system to compress the data before transmission, and the responsibility of the receiving system to decompress the data after reception. The sending and receiving systems have the burden of coordinating among themselves, over a negotiation phase, on which one of a number of compression/decompression techniques is available on both the systems to be used. This negotiation phase presents an overhead and may become an increasing burden as the number of compression/decompression techniques increases.

U.S. Pat. Nos. 5,557,749; 5,621,894; 5,956,490 and 6,175,856 disclose methods of data transfer that involve such a negotiation phase. Each of these patents teaches the transfer of data compressed according to a compression/decompression technique known by the sending system to be supported by the receiving system.

There are a number of disadvantages associated with a method of data transfer involving a negotiation phase. In the absence of a compression/decompression technique at the receiving system, a sending system cannot use the technique to compress data even if the technique proves to be most appropriate for the data type. To take advantage of more efficient compression/decompression techniques available on a sending system, a receiving system would have to be equipped with a relatively large amount of memory for storing these compression/decompression techniques.

SUMMARY

According to an aspect of the present invention, there is provided a method of transferring data from a sending system to a receiving system in a network. The sending system compresses the data according to a selected compression technique without regard to availability of a corresponding decompression technique at the receiving system and without a need to negotiate a common compression/decompression technique to use. The sending system sends the compressed data and an identifier identifying the selected compression technique in a message to the receiving system. Upon reception of the message, the receiving system determines, using the identifier, if the corresponding decompression technique is available at the receiving system. If it is determined that the decompression technique is not available, the receiving system acquires automatically the decompression technique from outside of the receiving system. The receiving system decompresses the compressed data using either the locally available or the acquired decompression technique.

According to another aspect of the present invention, there is provided a sending system and a receiving system that include means for sending and receiving data respectively using the method described above. According to yet another aspect of the present invention, there is provided two program storage devices readable by a computing device, each device tangibly embodying a program of instructions, executable by the computing device to cause the computing device to behave as a sending system and a receiving system respectively.

BRIEF DESCRIPTION OF DRAWINGS

The invention will be better understood with reference to the drawings, in which.

DETAILED DESCRIPTION

Figure 1:
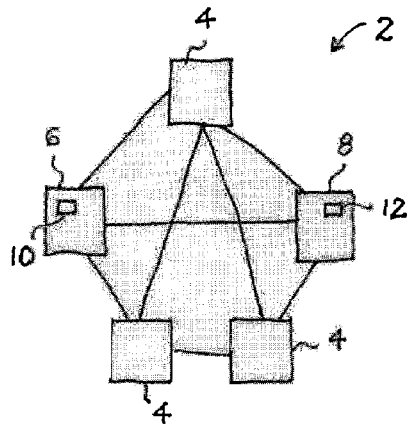
FIG. 1 is a drawing showing a computer network having a plurality of nodes including a sending system that uses a method according to the present invention to transfer data to a receiving system.

FIG. 1 is a schematic drawing illustrating a computer network 2 incorporated with the teachings of the present invention. The computer network 2 includes a number of nodes 4, 6, 8. Each node 4 is a connection point, either a redistribution point or an end point for data transmissions. In general, a node 4, 6, 8 is a computing device that has the capability to recognize and process or to forward transmissions to other nodes 4, 6, 8.

The nodes 4, 6, 8 exchange messages which contain compressed data. The compressed data represents sound, video and other information. Compression of data can increase the speed, reliability, and performance of data communication. Herein, a node 4 that transmits or sends a message is referred to as a sending system 6 while a node 4 that receives the message is referred to as a receiving system 8. A single node 4 can be both a sending system 6 as well as a receiving system 8.

While the computer network 2 in FIG. 1 is wired and has a star-like topology, it will be appreciated that the principles according to the present invention may be practiced with wired networks of other topologies as well as with wireless communication networks. In a wireless communication network, examples of sending and receiving systems 6, 8 include cellular phones, personal digital assistants equipped with wireless connection to a network and other devices likewise.

Hereafter, a preferred embodiment of the present invention will be described in the context of two computing devices 6, 8 operating in a client/server model in the computer network 2. In such a client/server model shown in FIG. 1, a client application program or simply a client 10 running on one computing device 6 makes a service request to a server application program or simply server 12 on a remote computing device 8 that fulfils the request. In a typical client/server model, one server 12 is activated and awaits client requests. Multiple clients 10 share the services of the common server 12. Both the clients 10 and the server 12 are usually part of a larger application.

An example of a computer network 2 with computing devices 4, 6, 8 operating in a client/server model is the Internet. The web browser on a computing device 6 used to access the Internet is a client 10 that requests services, such as the downloading of web pages or files, from a web or Hypertext Transport Protocol (HTTP) server 12 on a remote computer somewhere on the Internet. Similarly, a computing device 6 with TCP/IP installed allows a client 10 to request files from a File Transfer Protocol (FTP) server 12 on other computing devices 8 on the Internet.

Figure 2:
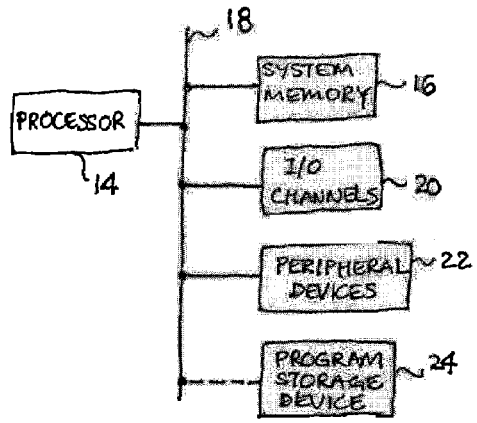
FIG. 2 is a block diagram showing typical hardware elements of one of the nodes in FIG. 1.

FIG. 2 is a block diagram illustrating typical elements of a computing device 4, 6, 8. The elements include a programmable processor 14 connected to a system memory 16 via a system bus 18. The processor 14 accesses the system memory 16 as well as other input/output (I/O) channels 20 and peripheral devices 22. The computing device 4, 6, 8 further includes at least one program storage device 24, such as a CD-ROM, tape, magnetic media, EPROM, EEPROM, ROM or the like that stores one or more computer programs that implement a method of data transfer according to the present invention. The processor 14 reads and executes the one or more computer programs to perform the method. This method will be described shortly. Each of the computer programs may be implemented in any desired computer programming language (including machine, assembly, high level procedural, or object oriented programming languages). In any case, the language may be a compiled or interpreted language.

Figure 3:
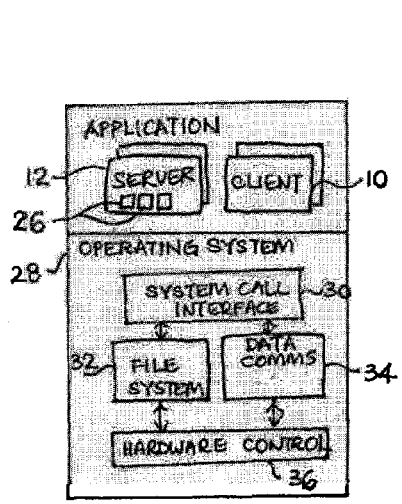
FIG. 3 is a block diagram showing typical software elements of one of the nodes in FIG. 1.

FIG. 3 illustrates typical software elements of a computing device 4, 6, 8 in the computer network 2. Each computing device 4, 6, 8 includes at least a client 10 or a server 12 or both executing on the computing device 4, 6, 8. The server 12 includes at least one data encoding/decoding or compression/decompression technique 26. The processor 14 executes the client 10 and the server 12 using a set of system services provided by an operating system (OS) 28. The OS 28 includes a system call interface 30 for accessing the set of system services. The set of system services includes file system services 32, data communications services 34 and hardware control services 36 known to those skilled in the art. The data communications services 32 include services for handling various communication protocols, such as the Transmission Control Protocol (TCP) and for adding and removing header/trailer information to data being sent and received to facilitate their routing, and to prevent data corruption. The hardware control services 36 include services for interacting with a physical transmission medium.

Figure 4:
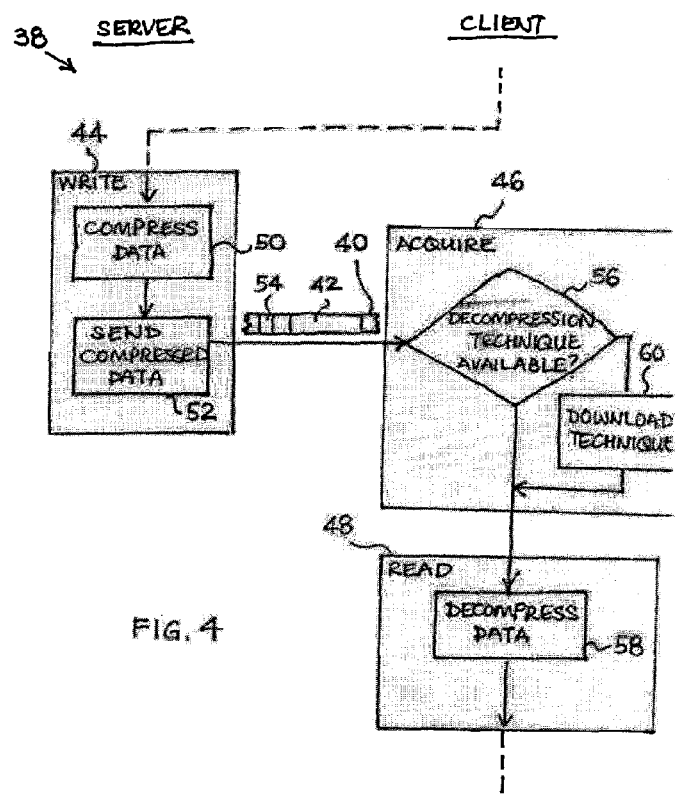
FIG. 4 is a flowchart of a sequence of steps for transferring data according to the method of the invention.

FIG. 4 is a flowchart illustrating a sequence 38 of steps for implementing the method of data transmission and reception according to an embodiment of the present invention. Broadly, as illustrated, the server 12 upon receiving a service request from the client 10 transmits a message 40 containing compressed data 42 to the client in a WRITE step 44. When the client 10 receives the message 40, the client 10 determines if the client 10 has local access to a selected compression/decompression technique of the at least one compression/decompression technique 26 used by the server 12 to compress the data in an ACQUIRE step 46. If it is determined that the client 10 does not have local access to the selected technique of the at least one compression/decompression technique 26, the client 10 acquires code that implements the selected technique from outside the computing device 6 on which the client 10 resides. Once acquired, the client 10 uses the acquired technique in a READ step 48 to decompress the compressed data 42.

The broadly described WRITE, ACQUIRE and READ steps 44, 46 and 48 are described in more details next. As shown in FIG. 4, the WRITE step 44 includes a COMPRESS DATA step 50, wherein the server 12 selects an appropriate compression/decompression technique from amongst the at least one compression/decompression techniques 26 locally available at the server 12 to compress raw data that is to be sent to the client 10. The technique is selected based on whether the data represents video, sound or text. A specific technique may be selected for video data compression depending on whether there is reduction in video image complexity, elimination of certain video features, reduction in frame update rate or window size, or other video related features. Also, a specific audio data compression technique may be chosen depending on whether stereo is turned on or off. The selection is made without regard to availability of the technique at the client 10. After the data is compressed, it is transmitted to the client 10 in the message 40 in a SEND COMPRESSED DATA step 52. The message 40 is formed using the data communications services 34 described earlier. In addition to the compressed data 42, the message 40 includes a unique identifier 54, stored for example in a header of the message 40, that identifies the compression/decompression technique that is selected. This identifier 54 may be represented by a predetermined number of bits in the message 40.

Similarly, the ACQUIRE step 46 includes a DECOMPRESSION TECHNIQUE AVAILABLE? step 56, wherein the client 10 determines, using the identifier 54 in the message 40, if the selected compression/decompression technique of the at least one compression/decompression technique 26 used to produce the compressed data 42 in the message 40 is available at the client 10. If it is determined that the selected technique is locally available, the client 10 proceeds to decompress the compressed data using the selected technique in a DECOMPRESS DATA step 58. If it is however determined that the selected technique is not locally available at the client 10, the client 10 automatically acquires the selected technique from a source outside the computing device 6 on which the client 10 resides, such as the computing device 8 hosting the server 12. In acquiring the selected technique, the client 10 sends a request to the source in a DOWNLOAD TECHNIQUE step 60 to request the downloading of the technique onto the client 10. Once the client receives the technique, the client 10 proceeds to the DECOMPRESS DATA step 58 to decompress the compressed data 42 using the downloaded technique.

The source of the compression/decompression technique may be the server from which the message originated as suggested earlier. Preferably, the compression/decompression technique is implemented in a platform-independent language such as the JAVA™ programming language, developed by Sun Microsystems. In such a case, the computing device 6 on which the client 10 resides includes a JAVA™ virtual machine (not shown). The JAVA™ virtual machine is a software that acts as an interface between JAVA™ binary code or bytecode and the processor 14. The JAVA™ virtual machine interprets the JAVA™ bytecode one instruction at a time and maps it to instructions that the processor 14 executes. Alternatively, a just-in-time (JIT) compiler (not shown) further compiles the JAVA™ bytecode to produce platform-specific executable code for the processor 14 to execute. The JIT compiler is usually supplied with the JAVA™ virtual machine and is used optionally.

Alternatively, the source of the compression/decompression technique may be another server that resides on a separate computing device 4. This source may for example download platform-specific code instead of JAVA™ bytecode of the requested technique to the computing device 6 hosting the client 10.

In any case, the compression/decompression technique may be downloaded in a compressed format that is available at the client 10. The DOWNLOAD TECHNIQUE step 60 may include sending, by the client 10, a download request (not shown) to the source that includes identifiers identifying compression/decompression techniques that are available at the client 10. The identifiers may be arranged in a sequence that indicates the order of preference of the client 10.

The acquired compression/decompression technique may be stored in the persistent store of the computing device 6 on which the client 10 resides. The acquired technique is added to the list of compression/decompression techniques available at the client. If there is insufficient memory in the persistent store to accommodate the acquired compression/decompression technique, the client 10 may purge at least one least used compression/decompression technique resident in the persistent store in order to make room for storing the acquired compression/decompression technique.

Advantageously, the present invention does away with the need for a negotiation phase, thereby allowing a quicker transfer of data to a client 10 if the compression/decompression technique used to compress the data is available at the client 10. As compressing of data is independent of compression/decompression techniques available at the client 10, the data may be compressed prior to a client's request for the data. In this manner, the overall time required to transfer the data is further reduced. Moreover, with the ability to automatically download a locally unavailable compression/decompression technique when required, the client 10 need not store all available compression/decompression techniques.

Although the present invention is described according to the embodiment above, it is not to be construed to be limited as such. For example, instead of limiting the invention for practice in a computer network between a web server and a client browser, the invention may be practiced in other types of network, such as a wireless data network and a telephone network. In the latter case, the method of data transfer may be implemented on fax machines and other devices on the network that exchange compressed data.

As another example, if the compression/decompression technique can be de-coupled into a compression portion and a corresponding decompression portion, the client may download the decompression portion only.

As yet another example, instead of limiting the implementation of the invention to only software means, those skilled in the art know that the invention can also be either partially or wholly implemented using hardware means.

I claim:

1. A method of transferring data from a sending system to a receiving system in a network, the method comprising:
    compressing the data, by the sending system, according to a selected compression technique without regard to availability of a corresponding decompression technique at the receiving system;
    sending, by the sending system, the compressed data and an identifier identifying the selected compression technique in a message to the receiving system;
    determining, by the receiving system, if the corresponding decompression technique is locally available at the receiving system using the identifier;
    acquiring automatically, by the receiving system, the corresponding decompression technique from outside of the receiving system if the corresponding decompression technique is not locally available, said corresponding decompression technique being acquired in a compressed format that can be decompressed using a decompression technique that is locally available at the receiving system; and
    decompressing, by the receiving system, the compressed data using either the acquired or the locally available corresponding decompression technique;
    wherein acquiring the corresponding decompression technique includes sending, by the receiving system, a download request to the sending system, the download request including at least one identifier identifying a decompression technique that is locally available at the receiving system, and the at least one identifier is arranged in a sequence indicating an order of preference of the receiving system.

2. The method according to claim 1, wherein acquiring the corresponding decompression technique includes acquiring the corresponding decompression technique from the sending system.

3. The method according to claim 1, wherein acquiring the corresponding decompression technique includes acquiring the corresponding decompression technique from a system separate from the sending system.

4. The method according to claim 1, further including:
    storing, by the receiving system, the acquired corresponding decompression technique in a persistent store of the receiving system.

5. The method according to claim 4, further including:
    purging, by the receiving system, at least one least used decompression technique resident in the persistent store to create sufficient space to store the acquired corresponding decompression technique.

6. The method according to claim 1, wherein the sending system is a server and the receiving system is a client and wherein the data is compressed and stored in the server prior to any request by the client for the data.

7. A receiving system in a network for retrieving data from a message containing the data in a compressed format and an identifier identifying a compression technique used to compress the data, the receiving system comprising:
    means for receiving the message from a sending system;
    means for determining from the identifier if a corresponding decompression technique is locally available at the receiving system;
    means for automatically acquiring the corresponding decompression technique if the decompression technique is determined to be not available locally,
    wherein said means being adapted to send a download request to the sending system, the download request including at least one identifier identifying a decompression technique that is locally available at the receiving system, and the at least one identifier is arranged in a sequence indicating an order of preference of said receiving system, and wherein said means being adapted to acquire said corresponding decompression technique in a compressed format that can be decompressed using a decompression technique that is locally available at the receiving system; and
    means for using the locally available or the acquired corresponding decompression technique to decompress the compressed data.

8. A sending system in a network for transferring data to a receiving system, the sending system comprising:
    means for compressing the data according to a selected compression technique without regard to availability of a corresponding decompression technique at the receiving system;
    means for sending the compressed data and an identifier identifying the selected compression technique in a message to the receiving system;
    means for receiving a request from the receiving system to transfer the corresponding decompression technique to the receiving system, said request including at least one identifier identifying a decompression technique that is locally available at the receiving system, and the at least one identifier is arranged in a sequence indicating an order of preference of the receiving system; and means for transferring the requested corresponding decompression technique to the receiving system, said means being adapted to transfer said requested corresponding decompression technique in a compressed format that can be decompressed using a decompression technique that is locally available at the receiving system.

9. A program storage device readable by a computing device, tangibly embodying a program of instructions, executable by the computing device to perform the method for retrieving data from a message containing the data in a compressed format and an identifier identifying a compression technique used to compress the data, the method comprising:

receiving the message from a sending system;

determining from the identifier if a corresponding decompression technique is locally available at the computing device;

automatically acquiring the corresponding decompression technique from outside of the computing device if it is determined that the corresponding decompression technique is not available locally, said corresponding decompression technique being acquired in a compressed format that can be decompressed using a decompression technique that is locally available at the receiving system; and decompressing the compressed data using the locally available or the acquired corresponding decompression technique;

wherein acquiring the corresponding decompression technique includes sending, by the receiving system, a download request to the sending system, the download request including at least one identifier identifying a decompression technique that is locally available at the receiving system, and the at least one identifier is arranged in a sequence indicating an order of preference of the receiving system.

10. A program storage device readable by a computing device, tangibly embodying a program of instructions, executable by the computing device to perform the method for transferring data to a receiving system in a network, the method comprising:

compressing the data according to a selected compression technique without regard to availability of a corresponding decompression technique at the receiving system;

sending the compressed data and an identifier identifying the selected compression technique in a message to the receiving system;

receiving a request from the receiving system to transfer the corresponding decompression technique to the receiving system, said request including at least one identifier identifying a decompression technique that is locally available at the receiving system, and the at least one identifier is arranged in a sequence indicating an order of preference of the receiving system; and transferring the requested corresponding decompression technique to the receiving system, said requested corresponding decompression technique being transferred in a compressed format that can be decompressed using a decompression technique that is locally available at the receiving system.

* * * * *